United States Patent
Hannan et al.

(10) Patent No.: US 10,827,444 B2
(45) Date of Patent: Nov. 3, 2020

(54) METHOD AND SYSTEM FOR DETERMINING MOVE LISTS FOR SHARED ACCESS SYSTEMS INCLUDING A TIME DOMAIN DUPLEXING SYSTEM

(71) Applicant: CommScope Technologies LLC, Hickory, NC (US)

(72) Inventors: Ariful Hannan, Sterling, VA (US); Raina Rahman, Herndon, VA (US); Navin Srinivasan, Fairfax, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/538,506

(22) Filed: Aug. 12, 2019

(65) Prior Publication Data
US 2020/0052871 A1 Feb. 13, 2020

Related U.S. Application Data

(60) Provisional application No. 62/736,325, filed on Sep. 25, 2018, provisional application No. 62/726,861, filed on Sep. 4, 2018, provisional application No. 62/718,264, filed on Aug. 13, 2018.

(51) Int. Cl.
| | | |
|---|---|---|
| *H04W 52/36* | (2009.01) | |
| *H04W 52/24* | (2009.01) | |
| *H04L 5/14* | (2006.01) | |
| *H04W 16/14* | (2009.01) | |
| *H04W 72/04* | (2009.01) | |

(Continued)

(52) U.S. Cl.
CPC ......... *H04W 52/367* (2013.01); *H04L 5/1469* (2013.01); *H04W 16/14* (2013.01); *H04W 52/242* (2013.01); *H04W 52/243* (2013.01); *H04W 72/0446* (2013.01); *H04W 16/28* (2013.01); *H04W 72/082* (2013.01)

(58) Field of Classification Search
None
See application file for complete search history.

(56) References Cited

U.S. PATENT DOCUMENTS

| | | |
|---|---|---|
| 2008/0069039 A1 | 3/2008 | Li et al. |
| 2015/0326463 A1 | 11/2015 | Solondz |
| 2017/0170888 A1 | 6/2017 | Yrjola et al. |

(Continued)

FOREIGN PATENT DOCUMENTS

| | | |
|---|---|---|
| KR | 1020160040624 A | 4/2016 |
| WO | 2016033049 A1 | 3/2016 |
| WO | 2018139714 A1 | 8/2018 |

OTHER PUBLICATIONS

International Searching Authority, "International Search Report and Written Opinion from PCT Application No. PCT/US2019/043253", from Foreign Counterpart to U.S. Appl. No. 16/507,965, dated Nov. 13, 2019, pp. 1-11, Published: WO.

(Continued)

*Primary Examiner* — Jutai Kao
(74) *Attorney, Agent, or Firm* — Fogg & Powers LLC

(57) ABSTRACT

Techniques for determining a move list identifying radios—of a shared access system including at least one time division duplexing system—are provided. The radios transmissions in spectrum shared with an incumbent receiver cease upon the incumbent receiver entering a protection region.

20 Claims, 7 Drawing Sheets

(51) Int. Cl.
*H04W 72/08* (2009.01)
*H04W 16/28* (2009.01)

(56) References Cited

U.S. PATENT DOCUMENTS

| | | | |
|---|---|---|---|
| 2017/0188314 A1 | 6/2017 | Mueck et al. | |
| 2017/0223638 A1 | 8/2017 | Lopes et al. | |
| 2017/0243139 A1* | 8/2017 | Dzierwa | H04B 17/27 |
| 2017/0295578 A1 | 10/2017 | Khoshnevisan et al. | |
| 2017/0318470 A1 | 11/2017 | Srikanteswara et al. | |
| 2018/0014304 A1 | 1/2018 | Khoshnevisan et al. | |
| 2018/0316416 A1* | 11/2018 | Reis | H04B 7/18513 |
| 2019/0081690 A1* | 3/2019 | Mueck | H04W 52/243 |
| 2020/0162929 A1* | 5/2020 | Cimpu | H04W 52/367 |

OTHER PUBLICATIONS

International Searching Authority, "International Search Report and Written Opinion from PCT Application No. PCT/US2019/046190", from Foreign Counterpart to U.S. Appl. No. 16/538,459, dated Nov. 28, 2019, pp. 1-11, Published: WO.

3GPP, "3rd Generation Partnership Project; Technical Specification Group Radio Access Network; Evolved Universal Terrestrial Radio Access (E-UTRA); Physical channels and modulation (Release 15)", 3GPP TS 36.211, V15.7.0, Sep. 2019, pp. 1-239, 3rd Generation Partnership Project.

Drocella et al., "3.5 GHz Exclusion Zone Analyses and Methodology", NTIA Report 15-517, Mar. 2016, pp. 1-103, U.S. Department of Commerce.

Hannan, Ariful et al., "Method and System for Determining Contribution to Aggregate Interference by a Time Division Duplexing System", U.S. Appl. No. 16/507,965, filed Jul. 10, 2019, pp. 1-27, Published: US.

Hufford, "The ITS Irregular Terrain Model, version 1.2.2 the Algorithm", National Telecommunications and Information Administration, Institute for Telecommunication Sciences, 2002, pp. 1-18, Boulder, CO.

Wif, "Requirements for Commercial Operation in the U.S. 3550-3700 MHz Citizens Broadband Radio Service Band", Version V1.4.1, Jan. 16, 2018, pp. 1-77, The Software Defined Radio Forum Inc.

Wif, "Requirements for Commercial Operation in the U.S. 3550-3700 MHz Citizens Broadband Radio Service Band", Version V1.5.0, May 1, 2018, pp. 1-77, The Software Defined Radio Forum Inc.

Wif, "Requirements for Commercial Operation in the U.S. 3550-3700 MHz Citizens Broadband Radio Service Band", Version V1.7.0, May 6, 2019, pp. 1-80, The Software Defined Radio Forum Inc.

Wif, "Requirements for Commercial Operation in the U.S. 3550-3700 MHz Citizens Broadband Radio Service Band", Version V2.0.0, Feb. 3, 2017, pp. 1-73, The Software Defined Radio Forum Inc.

Wif, "Signaling Protocols and Procedures for Citizens Broadband Radio Service (CBRS): Spectrum Access System (SAS)—Citizens Broadband Radio Service Device (CBSD) Interface Technical Specification", Version V1.2.1, Jan. 3, 2018, pp. 1-60, The Software Defined Radio Forum Inc.

* cited by examiner

METHOD AND SYSTEM FOR DETERMINING MOVE LISTS FOR SHARED ACCESS SYSTEMS INCLUDING A TIME DOMAIN DUPLEXING SYSTEM

CROSS-REFERENCE TO RELATED APPLICATIONS

The present application claims benefit of U.S. patent application Ser. No. 62/718,264, filed Aug. 13, 2018; U.S. patent application Ser. No. 62/726,861, filed Sep. 4, 2018; and U.S. patent application Ser. No. 62/736,325, filed Sep. 25, 2018; the entire contents of each of the aforementioned patent applications are incorporated herein by reference as if set forth in its entirety.

BACKGROUND

Shared spectrum usage by governmental and commercial users has been proposed, e.g. for Citizens Broadband Radio Service (CBRS) specified by the United States Federal Communications Commission (FCC). With shared spectrum usage, a multitude of wireless service providers may utilize such spectrum. Each service provider would employ a system of citizens broadband radio service device(s) (CBSD(s)), such as base station(s), e.g. that would facilitate communications with user equipment (or end user devices (EUDs). The system's CBSDs would be coupled to other networks, such as the Internet, e.g. by a core network.

The CBSDs are part of a shared access system ("SAS"). A SAS controller, of a SAS, regulates, e.g. the number and transmit power emissions of CBSDs that operate in the frequency spectrum in the neighborhood. A CBSD must request permission from the SAS controller prior to transmitting in frequency spectrum controlled by the SAS controller. Optionally, the CBSD also requests that the SAS controller permit the requesting CBSD to transmit at a specific requested power level. The SAS controller then determines whether to allow the requesting CBSD to transmit in the frequency spectrum, and allocates using, e.g. an iterative allocation process (IAP), transmit power levels to all CBSDs authorized by the SAS controller to transmit in the frequency spectrum. WInnForum SAS general requirement (requirement) R2-SGN-16 of WINNF-TS-0112 defines the IAP. The IAP determines such transmit power levels by allocating interference margin fairly to CBSDs in neighborhoods of protection points of one or more of each of a fixed satellite service (FSS), a priority access license (PAL) protection area (PPA), a grandfathered wireless protection zone (GWPZ), and an environmental sensing capability (ESC) system. The foregoing systems are fixed in location and deemed to be receiving all the time at their fixed location.

However, there are dynamic protection areas (DPAs) comprising protection points, where incumbent receivers intermittently operate and require protection. One example of such a receiver is a receiver of a naval shipborne RADAR, where the ship may occasionally traverse through the DPA. The receivers in the DPA are thus deemed to not to be fixed in location and only intermittently receive in the DPA. The location of the receiver in the DPA is unknown. Requirement R2-SGN-25 of WINNF-TS-0112 defines a dynamic protection method that halts transmissions of certain CBSD(s) around the DPA.

When an incumbent system becomes active in a DPA, the SAS controller is notified, e.g. by an ESC system or directly or indirectly by the incumbent system such as through a central database. The SAS controller may not know in which protection point of the DPA the incumbent is located. Pursuant to requirement R2-SGN-25, sort lists are created for each protection point, based on that a move list is created. The move list identifies CBSDs to be terminated when an incumbent system enters the DPA so that an aggregate interference level at each protection point in the DPA is below a threshold level, i.e. designated in requirement R2-SGN-25.

CBSD systems typically comprise at least one access point communicatively coupled to one or more user equipment ("UE"). Typically, the user equipment are communications devices that emit relatively low power levels, e.g. smart phones, tablets, etc. Typically, the transmission power of the user equipment is limited, e.g. by law or standard, for example to 23 dBm/10 MHz. Because the transmission power of user equipment is relatively low and the location of the user equipment is below clutter level, emissions of each user equipment in a neighborhood can be ignored for purposes of interference analysis at a protection point; only the access point(s) are deemed CBSD(s) because their effective isotropic radiated power (EIRP) may be up to 47 dBm/10 MHz and their antenna height in most cases is above the clutter level.

However, some CBSD systems include user equipment (UE) that is consumer premises equipment (CPE) for fixed wireless systems. Such consumer premises equipment has a significantly higher transmission power level, e.g. 47 dBm/10 MHz, than typical user equipment. Emissions of such consumer premises equipment in a neighborhood may not be below the clutter level for purposes of interference analysis at a protection point. Therefore, laws, rules, and/or standards require that such CPE user equipment be deemed CBSDs or CPE-CBSDs whose transmissions and transmit power levels must be authorized by the SAS controller of the SAS which includes such CPE-CBSDs.

Typically, in a communications system with CPE(s) and access point(s) ("CPE system"), the CPE(s) and corresponding access point(s) (or base stations) operate using time division duplexing ("TDD"). As a result, generally only one consumer premises equipment or one access point transmits in a channel at a given time period. Notwithstanding such operation, the WInnForum standard requires that any transmitter operating with an EIRP over 23 dBm/10 MHz must be registered as a CBSD and its contribution in interference calculation is aggregated. This example is not limited to Fixed Wireless Case and is true for any TDD system. A Distributed Antenna System (DAS) having multiple remote antenna units (RAUs) connected to a common baseband controller can share the RF resources among the RAUs and will not transmit on two or more RAUs using the same RF resource. However, this causes the SAS controller to inefficiently allocate transmit power to CBSDs of the SAS. Power levels are assigned to each CBSD in a SAS assuming that each TDD CBSD (access point(s) and CPE-CBSD(s)) of a TDD system or each RAU of a DAS system are transmitting simultaneously. Aggregate interference is determined using each CBSD in a TDD system assuming that they are transmitting simultaneously. As a result, higher aggregate interference levels are erroneously calculated. This may result in more CBSDs being identified on a move list then necessary. Hence, more CBSDs may be prevented from transmitting then is necessary to maintain aggregate interference below the threshold level. Therefore, there is a need for a more efficient technique to determine move lists (or which CBSDs should be prevented from transmitting for SASs including TDD system(s) when an incumbent operates in a DPA.

SUMMARY OF THE INVENTION

A method for determining a move list for a region of points, comprising: determining an initial sort list of an $M^{th}$ point of the region; if there is more than one time division duplexing (TDD) radio of a TDD system in the initial sort list, then generating a modified sort list for the $M^{th}$ point with respect to look angles about the $M^{th}$ point including at least two TDD radios within the neighborhood; generating at least one of: look angle removal lists for each look angle about the $M^{th}$ point based upon determining interference levels of radios in the modified sort list, or the initial sort list if there is no modified sort list, for the $M^{th}$ point; and a point move list for the $M^{th}$ point based upon a union of the look angle removal lists; and generating, from the look angle removal lists or the point move list, the move list identifying radios whose transmissions cease upon an incumbent receiver entering the region.

DRAWINGS

DETAILED DESCRIPTION

A technique for more accurately identifying CBSDs (in a SAS including a TDD system) whose transmission should be terminated in shared spectrum when an incumbent, e.g. a receiver of an incumbent, is in a DPA, is described. The interference free operation of the incumbent takes precedence over the operation of any CBSDs. Interference free means that the levels of interference in frequency spectrum used by a receiver of an incumbent is below a threshold level.

The technique may determine a move list in the following manner. A largest interferer of TDD CBSDs of a TDD system in a look angle of a protection point is identified for each look angle. A sort list for the protection point is generated; the sort list comprises all CBSDs in the neighborhood of the protection point except for the TDD CBSDs of a TDD system that are not the largest interferer in any look angle. A point move list for the protection point is generated based upon determining interference levels of CBSDs (i.e. TDD and non-TDD CBSDs) in the sort list. A move list is generated from a union of CBSDs in each point move list. As a result, a more accurate move list is created then using the conventional techniques identified in requirement R2-SGN-25 which requires that the interference level of all TDD CBSDs in the TDD system be analyzed. Thus, using embodiments of the present invention, potentially fewer CBSDs proximate to a DPA may be placed on a move list. As a result, transmissions of potentially fewer CBSDs are terminated when an incumbent is in the DPA.

A TDD system means a communications system comprised of CBSDs, e.g. CPE(s) and access point(s), which operate using TDD on a frequency channel. With TDD, only one CBSD transmits during a given time period. A TDD CBSD means a CBSD, e.g. CPE(s) and access point(s), which operate using TDD on a frequency channel or frequency spectrum.

Figure 1:
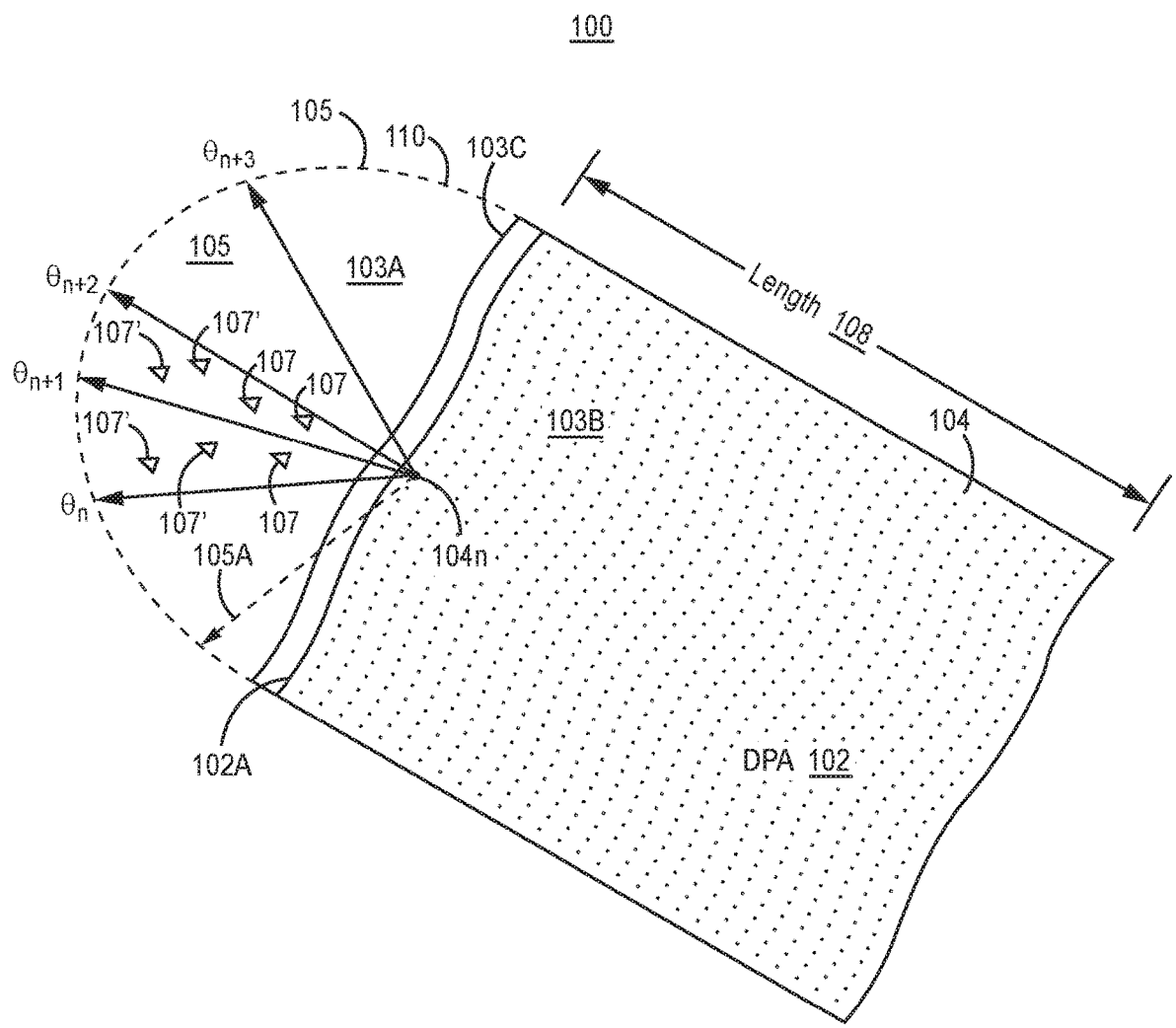
FIG. 1 illustrates one embodiment of a map with exemplary CBSDs of a SAS proximate to a dynamic protection area.

FIG. 1 illustrates one embodiment of a map with exemplary CBSDs of a SAS proximate to a DPA (map) 100. The DPA may encompass land 103A and/or water 103B. The DPA 102 illustrated in FIG. 1 encompasses water 103B only, e.g. represents where RADAR on a Naval ship may be located. Such RADAR may be a SPN-43 RADAR. RADAR may have a mechanically swept antenna with a main beam, e.g. azimuthally swept three hundred and sixty degrees, or a phased array antenna with one or more main beams electrically directed. The DPA 102 comprises an array of protection points (array) 104. By performing analysis at some or all of the protection points in the array 104, the SAS determines which of its CBSDs 107, 107' must cease transmission in the shared frequency spectrum when an incumbent user's communication system operates in the DPA 102.

Optionally, the above-described determination is only performed on CBSDs 107, 107' in a neighborhood 105 of each protection point for which analysis is conducted. The neighborhood 105 is an area or region that is a circle or another shape. In the illustrated example, the neighborhood 105 is circular and defined by a radius (or a neighborhood distance 105A), e.g. three hundred kilometers, from a corresponding protection point 104n. The aforementioned determination is only made for CBSDs 107, 107' in neighborhoods of protection points where an analysis, as subsequently exemplified, is performed. Alternatively, a neighborhood can be a fixed area or region, independent of distance from any protection point. The farther a protection point is from a shoreline 103C, the more likely that the corresponding neighborhood will have fewer CBSDs.

In FIG. 1, an exemplary, or new, protection point 104n is analyzed. Optionally, the protection points in the array 104 are spaced 2 arc seconds from one another which corresponds to the distance or a multiple of distances between terrain data points in government (such as the U.S. Geological Survey) databases.

The map 100 illustrates look angles around the exemplary protection point 104n. Exemplary look angles included $\theta_n$, $\theta_{n+1}$, $\theta_{n+2}$, and $\theta_{n+3}$. Look angles of a protection point are discrete azimuthal angles around the protection point. Optionally, as illustrated in FIG. 1, the number of look angles around a protection point is equal to three hundred and sixty degrees divided by one half of the beam width (e.g. a 3 dB beam width) of the main beam of an antenna of the incumbent user's communication system, e.g. the RADAR described herein. Thus, as illustrated in FIG. 1, the beam width of look angle $\theta_{n+1}$ extends from look angle $\theta_n$ to look angle $\theta_{n+2}$. However, the number of look angles can be determined in alternative ways, e.g. as specified by the CBRS or SAS designer, government, and/or standards body.

The main beam of the antenna is defined by a beam width such as the 3 dB beam width. However, a different beam width other than a 3 dB beam width may be used.

An exemplary government communications system, the SPN-43 RADAR, has a 3 dB beam width of the main beam is three degrees. Thus, using the method described above, the number of look angles is two hundred and forty for the SPN-43 RADAR. Alternatively, using the same method, for other communications systems, the beam width, and thus the number of look angles, may differ.

For each protection point, the SAS, e.g. the SAS controller, generates a sort list identifying the CBSDs 107, 107' in the neighborhood of each protection point of a DPA. Excluding the antenna gain of the receiver at the protection point, the interference power level (or interference power spectral density) is determined for each CBSD in the neighborhood. The sort list is created by ordering the list of CBSDs from highest to lowest interference power level. "Power level" may also be referred to herein as 'power'.

In FIG. 1, some of the CBSDs 107, 107' are CBSDs 107' of a TDD system (or TDD CBSDs). For purposes of clarity, CBSDs 107 are non-TDD CBSDs, and CBSDs 107' are TDD CBSDs. Because the TDD CBSDs 107' do not transmit at the same time, if two or more TDD CBSDs of a TDD system are in a look angle of a protection point, then only the TDD CBSD having the highest interference power at the protection point is retained in the sort list; the other TDD CBSDs of the TDD system in the look angle are removed from the sort list.

For each look angle around a protection point, the receiver antenna gain is added to the interference power level of each CBSD in the sort list. If necessary, CBSDs are removed from the sort list so that the aggregate interference power (or power spectral density), e.g. 95th percentile thereof[1], is below a threshold level, e.g. −144 dBM/10 MHz. The removed CBSDs for each look angle form a look angle removal list. Upon performing, determining the look angle removal list for each look angle around a protection point, a protection point removal list is formed by the union of CBSDs in all look angle removal lists of the protection point. Note, look angles may be limited to a range, e.g. where only the portion of the neighborhood in the look angle encompasses land or CBSDs.

[1] The 95$^{th}$ percentile of the aggregate interference may be determined, for example, as specified in requirement R2-SGN-25.

The foregoing process may be performed for each protection point in the DPA. The move list is formed by a union of the CBSDs in the protection point removal lists. Alternatively, the move list is formed by a union of CBSDs of look angle removal lists for the protection point; no protection point removal lists need be created.

Optionally, if one or more TDD CBSDs of a TDD system is included in a move list of a DPA, then all TDD CBSDs of the TDD system are added to the move list. The move list is determined periodically or aperiodically by the SAS, e.g. the SAS controller. Thus, when the SAS is informed that an incumbent is in a DPA, it utilizes the move list to cease transmission of the CBSDs in the move list. Optionally, the CBSDs in the move list may be then permitted to transmit in another frequency spectrum; alternatively, such CBSDs may not be permitted to transmit at all.

Figure 2:
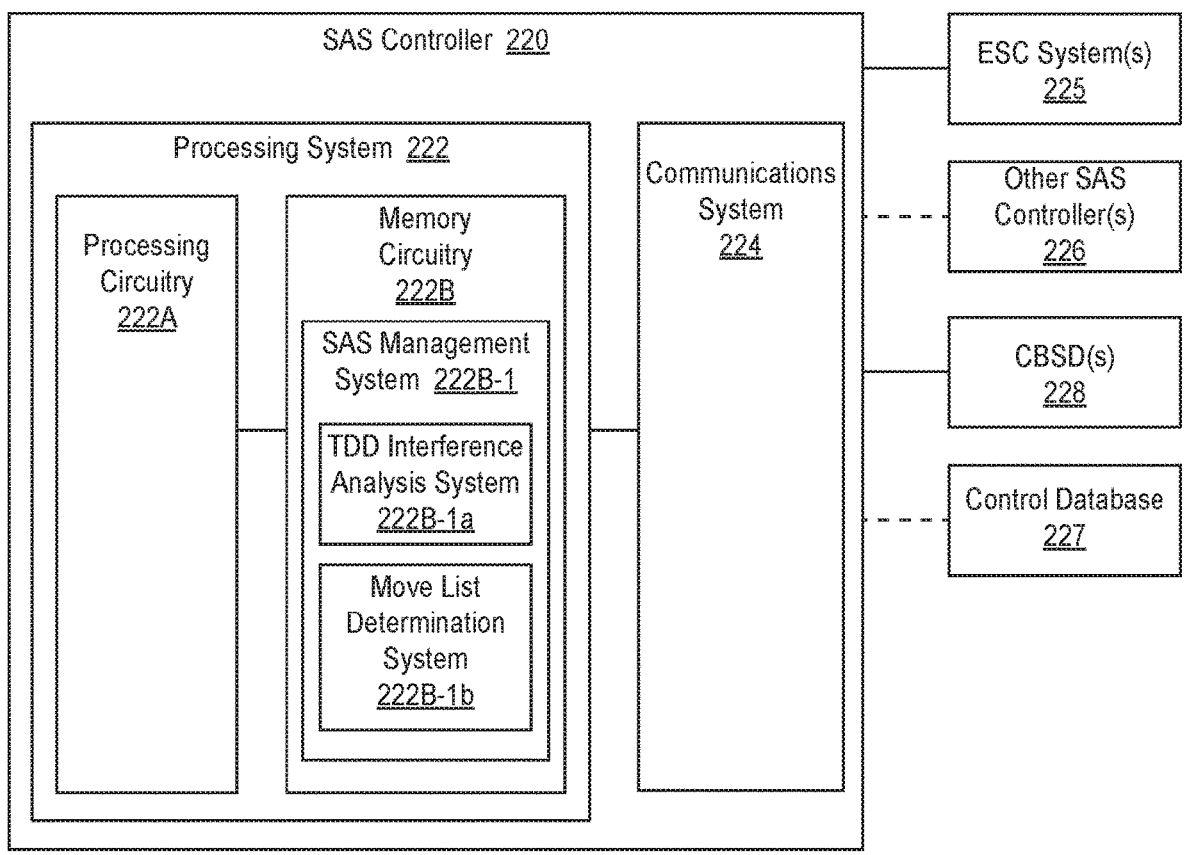
FIG. 2 illustrates one embodiment of a shared access system that is implemented according to embodiments of the invention.

FIG. 2 illustrates one embodiment of a SAS 200 that is implemented according to embodiments of the invention. The illustrated SAS 200 includes a SAS controller (or SAS controller circuitry) 220 coupled to one or more CBSDs (CBSD(s)) 228. Each CBSD is operated by a GAA user and/or a PAL.

In one embodiment, the SAS controller 220 is coupled to at least one environmental sensing capability system (ESC system(s)) 225. In another embodiment, the SAS controller 220 is coupled to a central database 227, e.g. which has information about when certain incumbent users (such as satellite ground stations) and/or PALs are transmitting. In a further embodiment, the SAS controller 220 is coupled to at least one other SAS controllers (other SAS controller(s)) 226, e.g. controlling other CBSDs operating in the same or overlapping frequency spectrum. For example, such other CBSDs controlled by other SAS controller(s) 226 and their PALs, GAA users, and associated incumbent users may generate electromagnetic energy that overlaps the geographic region and frequency spectrum of the CBSDs 228 controlled by SAS controller 220, and thus must be accounted for by the SAS controller 220 when the SAS controller 220 performs interference analysis and authorizes operation of CBSD(s) 228 of the PAL(s) and/or the GAA user(s). Alternatively, the SAS controller 220 and its PALs and GAA users, may generate electromagnetic energy that overlaps the geographic region of the other SAS controller(s) 226, and thus must be accounted for by the other SAS controller(s) 226 when the other SAS(s) perform interference analysis, and authorize operation of CBSDs of PALs and GAA users (associated with the other SAS controller(s) 226). By coupling SASs that are geographically proximate to one another, each SAS can account for electromagnetic energy emitted from those proximate geographies.

The ESC system 225 detects, and communicates to the SAS controller 220, the presence of signal(s), e.g. from some incumbent user(s), such as RADARs. Alternatively, incumbent users can inform the SAS controller 225 that they are operating, e.g. by transmitting a signal beacon, or communicating with the central database 227 which may be coupled to the SAS controller 220. Upon notification of operation of an incumbent user, the SAS controller 220, at least in part, models the propagation of transmissions of the CBSD(s) 228 and regulates the operation (e.g. power levels and frequencies of operation) of the CBSD(s) 228 to allow the incumbent user(s) to operate free of interference. The SAS controller 220 otherwise controls the operation (e.g. power levels and frequencies of operation) of the GAA user(s) so that the PAL(s) operate free of interference.

In one embodiment, the SAS controller 220 includes a processing system (or processing system circuitry) 222 coupled to a communications system 224. The processing system 222 controls the operation of CBSD(s) 228 that form part of the SAS 200.

The communications system 224 (and thus the SAS controller 220—e.g. the processing system 222) facilitates communications between the communications system 224 and other systems or devices, e.g. CBSD(s) 228, the ESC system(s) 225, the central database 227, and/or other SAS controllers(s) 226. In one embodiment, the communications system 224 includes a modem, e.g. an Internet data modem, a radio, and/or any other communications device(s) that can facilitate communications to the aforementioned devices.

Optionally, the processing system 222 may be a state machine, e.g. comprised of processing circuitry 222A coupled to memory circuitry 222B. Alternatively, the processing system 222 may be a neural network. In the illustrated embodiment, the memory circuitry 222B includes a SAS management system 222B-1. In the illustrated embodiment, the SAS management system 222B-1 includes a TDD interference analysis system 222B-1a and a move list determination system 222B-1b. The TDD interference analysis system 222B-1a determines the contribution to the aggregate interference at a protection point by each TDD systems in a corresponding neighborhood as further described herein. The move list determination system 222B-1b determines a move list identifying CBSDs to be terminated upon detection of an incumbent in a DPA so that the aggregate interference level at each protection point in the DPA is below a threshold level, e.g. as designated in requirement R2-SGN-25. However, the move list determination 222B-1b may be implemented in other ways.

The SAS management system 222B-1 also includes techniques for generating neighborhoods around each protection point, and determining the aggregate level of interference at each protection point. To this end, the SAS management system 222B-1 may include propagation models (e.g. the irregular terrain model and/or the Hata model (or variations thereof)) with which to determine path loss between CBSDs and protection point(s). The SAS management system 222B-1 may also include a database of information about CBSDs (e.g. geographic location, height, terrain morphology, and/or effective radiated power information); additionally and/or alternatively, the SAS management system 222B-1 may obtain information (e.g. geographic location, height, terrain morphology, and/or effective radiated power information); additionally and/or alternatively, the SAS management system 222B-1 may remotely obtain such information, e.g. from the central database 227 and/or from other SAS controller(s) 226.

Figure 3A:
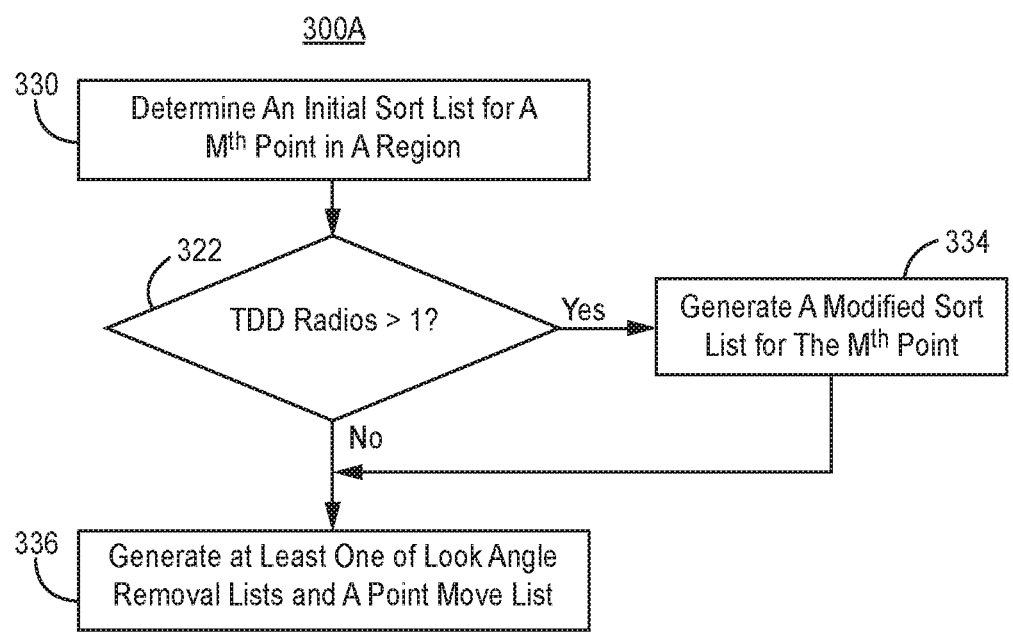
FIG. 3A illustrates one embodiment of a method for generating a point move list for a $M^{th}$ point of a protection region.

FIG. 3A illustrates one embodiment of a method 300A for generating a point move list for a $M^{th}$ point of a protection region (or region). To the extent that the method 300A shown in FIG. 3A is described herein as being implemented in the system shown in FIG. 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

The techniques described herein may have applicability to locations, e.g. points, other than protection points of a neighborhood. Therefore, protection point shall be more generally referred to as point. Further, because the technique can be used in systems other than a SAS, the more general term radio shall be used for CBSD. Optionally, some or all of the following blocks may be implemented for example in the TDD interference analysis system 222B-1a and/or the move list determination system 222B-1b; however, some or all of the blocks may be implemented elsewhere, e.g. elsewhere in the SAS controller 220.

In block 330, determine an initial sort list for the $M^{th}$ point. The initial sort list includes all CBSDs, including TDD CBSDs, in a neighborhood around the $M^{th}$ point.

In block 332, determine whether there is more than one TDD radio of a TDD system in the initial sort list. If there is not more than one TDD radio of the TDD system in the initial sort list, then proceed to block 336.

If there is more than one TDD radio of the TDD system in the initial sort list, then in block 334, generate a modified sort list for the $M^{th}$ point with respect to look angles about the $M^{th}$ point including at least two TDD radios within the neighborhood. The modified sort list comprises only the largest interferer of each TDD system in a look angle and neighborhood about the Mth point.

Then, optionally, in block 336 generate at least one of:
(a) look angle removal lists for each look angle about the $M^{th}$ point based upon determining interference levels of radios in the modified sort list, or the initial sort list if there is no modified sort list, for the $M^{th}$ point; and
(b) a point move list for the $M^{th}$ point based upon a union of the look angle removal lists.

The point move list identifies radios in the modified sort list (or initial sort list if there is no modified sort list) that generate the largest interference at the point and whose transmissions need to cease when an incumbent receiver enters the region. When the transmission of the identified radios ceases, the aggregate interference at the point from transmissions of radios remaining in the sort list is below a desired threshold level. When determining the interference contribution of each radio, the antenna gain of the receiver that could be at the point is used to determine the interference level generated at the point by each radio.

The interference contribution may be determined on a look angle by look angle basis. The interference contribution of radios in the look angle being analyzed is modified by the main beam gain of the antenna of the receiver. The interference contribution of the radios outside of the look angle being analyzed is modified by the gain of the antenna outside of the main beam.

Figure 3B:
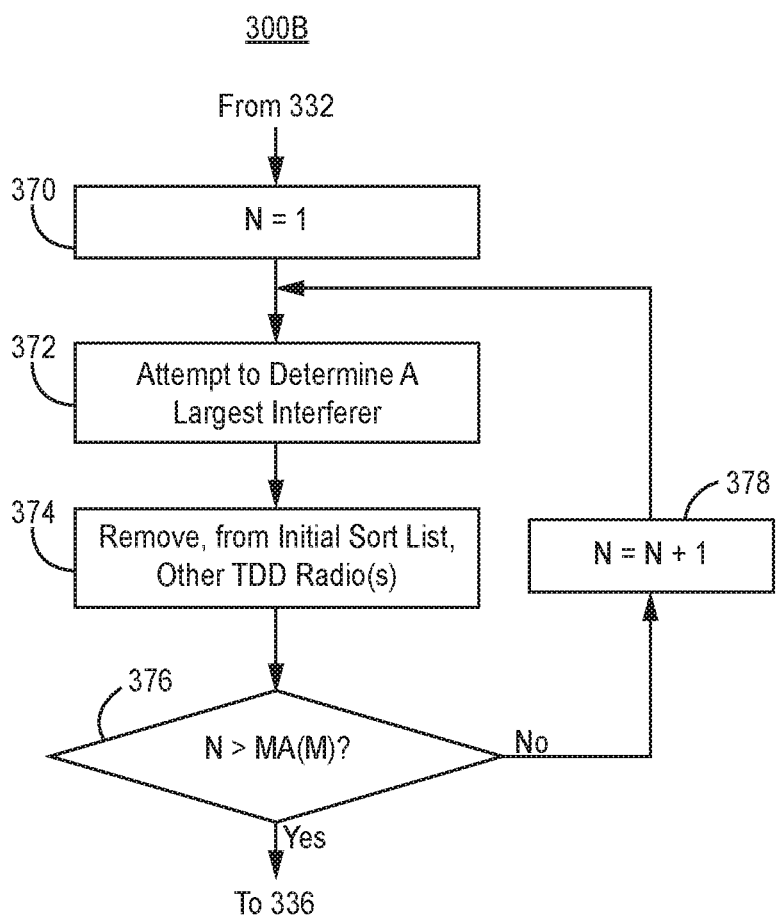
FIG. 3B illustrates one embodiment of a method for generating a modified sort list for a $M^{th}$ point of a protection region.

FIG. 3B illustrates one embodiment of a method 300B for generating a modified sort list for the $M^{th}$ point of the region. FIG. 3B illustrates one embodiment of block 334. To the extent that the method 300B shown in FIG. 3B is described herein as being implemented in the system shown in FIG. 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 370, set N equal to one, where N is an index, and identifies a look angle about the $M^{th}$ point in the region. In block 372, attempt to determine, or identify, the largest interferer in an Nth look angle about the $M^{th}$ point. The largest interferer means a TDD radio of the TDD system in the look angle, i.e. the Nth look angle, and in the region that generates the largest interference at the point in comparison to any and all other TDD radios, of the same TDD system. When attempting to determine the largest interferer, the antenna gain of the receiver—which could be at the point— is used to determine the interference level generated by each TDD radio at the point. For some look angles, there may be no TDD radios in the look angle, and thus no largest interferer will be identified.

In block 374, remove from the sort list the TDD radios of the TDD system that are not the largest interferer in the Nth look angle. In block 376, determine if N>MA(M), where MA(M) is the number of look angles for the $M^{th}$ point in the region. MA(M) may be determined by dividing 360 degrees by a beam width of incumbent receiver antennas (or an average thereof). MA(M) may alternatively be determined by the number of look angles that intersect land or CBSDs in a neighborhood; thus, MA(M) may vary by point. If N>MA(M), proceed to block 336. If N is not greater than MA(M), then in block 378, set N equal to N plus one, and then proceed to block 372.

In an alternative embodiment, MA(M) is the number of look angles, for the $M^{th}$ point in the region, including at least two TDD radios within the neighborhood. In this embodiment, N is an index, and identifies a look angle, about the $M^{th}$ point in the region, including at least two TDD radios within the neighborhood. In this embodiment, as each look angle to be analyzed includes at least two radios, block 372 would be determine, or identify, the largest interferer in an Nth look angle about the $M^{th}$ point.

Figure 3C:
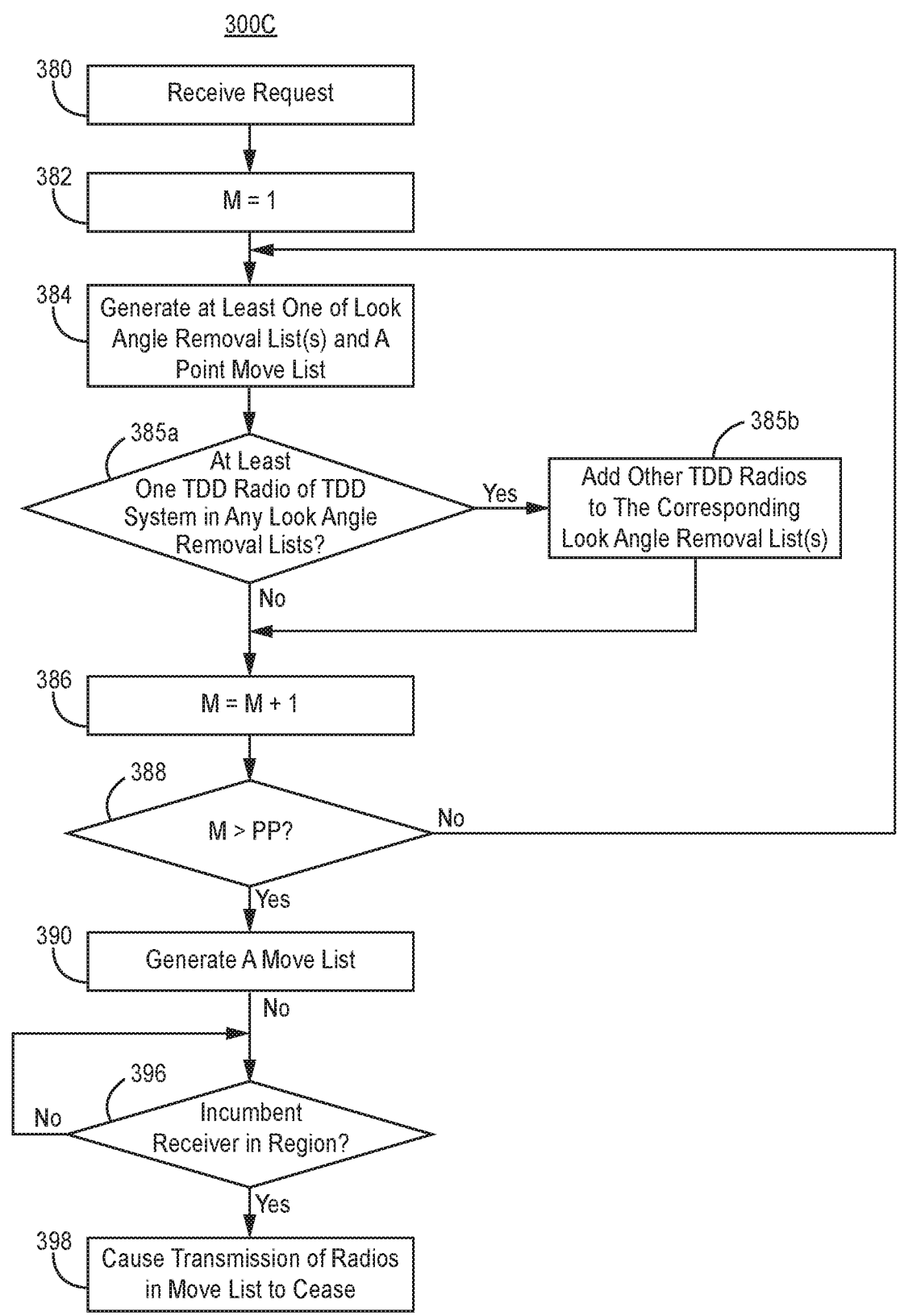
FIG. 3C illustrates one embodiment of a method of generating a move list.

FIG. 3C illustrates one embodiment of a method 300C of generating a move list. Optionally, the move list may be for a dynamic protection area in which an incumbent receiver may be located, and for which CBSDs of a SAS may have to terminate transmission in frequency spectrum shared by the CBSDs and the incumbent receiver. To the extent that the method 300C shown in FIG. 3C is described herein as being implemented in the system shown in FIG. 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

Optionally, in block 380, receive, e.g. at a SAS controller, at least one request from a TDD radio of a TDD system to transmit in frequency spectra; the TDD radios are part of a SAS and the frequency spectra is controlled by the SAS controller.

Optionally, in block 382, set M equal to one, where M identifies a point in the region, e.g. a DPA. Optionally, M is set to one prior to determining the initial sort list—e.g. as set forth in block 330—for the first time.

In block 384, generate at least one of:
(a) look angle removal lists for each look angle about the $M^{th}$ point based upon determining interference levels of radios in the modified sort list, or the initial sort list if there is no modified sort list, for the $M^{th}$ point; and
(b) a point move list for the $M^{th}$ point based upon a union of the look angle removal lists of the $M^{th}$ point.

Optionally, this may be performed as illustrated with respect to FIG. 3A.

In block 385a, determine if at least one TDD radio of a TDD system is in any of the look angle removal lists. If at least one TDD radio (of a TDD system) is in any of the look angle removal lists, then in block 385b, add all other TDD radios (of the TDD system)—which were in corresponding look angles and neighborhoods to corresponding look angle removal list(s) (and to the point move list if generated) but were not originally in the corresponding look angle removal lists. Thus, if a look angle removal list includes at least one TDD radio of a TDD system, any other TDD radios of the TDD system in the corresponding look angle and neighborhood (but were not originally in the corresponding look angle removal list) are added to the look angle removal list (and to the corresponding point move list if generated). Then, proceed to block 386. If no TDD radios of the TDD system are in any of the look angle removal lists, then proceed to block 386.

In block 386, set M equal to M plus one. In block 388, determine if M is greater than PP, where PP is a number of points in the region. If M is not greater than PP, then proceed to block 384. If M is greater than PP, then in block 390, generate a move list for the region of points from the union of radios in each of the point move lists determined in block 384. Thus, the move list is generated from the look angle removal lists or the point move list for each point in the region.

After block 390, optionally proceed to optional block 396. Alternatively, stop after block 390. Optionally, in block 396, determine whether an incumbent receiver is in the region. Optionally, in block 398, if an incumbent receiver is in the region, cause the radios in move list to cease transmitting in the frequency spectrum.

Figure 4:
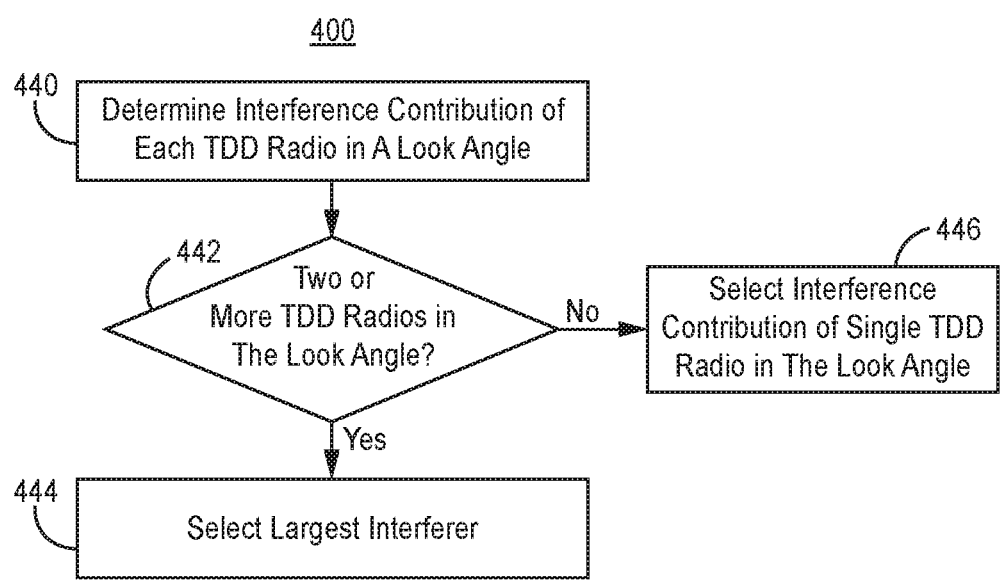
FIG. 4 illustrates one embodiment of a method of determining a largest interferer in a time division duplexing system.

FIG. 4 illustrates one embodiment of a method of determining a largest interferer in a time division duplexing system 400. FIG. 4 illustrates one embodiment of how to implement block 372. The method of FIG. 4 is performed for each TDD system having a radio in the neighborhood.

To the extent the method 400 shown in FIG. 4 is described herein as being implemented in the system shown in FIG. 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 440, determine an interference contribution of each TDD radio (of a TDD system) in frequency spectrum and at a look angle of a point. When determining interference contribution, the antenna gain of the receiver that could be at the point is used to determine the interference level generated by each TDD radio (in the look angle) at the point.

In block 442, determine if the TDD system has two or more TDD radios (transmitting in the frequency spectrum) in the look angle. In block 444, if the TDD system has two or more TDD radios (transmitting in the frequency spectrum) in the look angle, select a largest interferer from the two or more TDD radios in the look angle. The largest interferer has an interference contribution (e.g. power level) in the frequency spectrum at the point greater than the interference contribution of other TDD radios (of the TDD system) in the look angle.

In block 446, if the TDD system has one TDD radio (transmitting in the frequency spectrum) in the look angle, then select the one TDD radio as the largest interferer.

Figure 5:
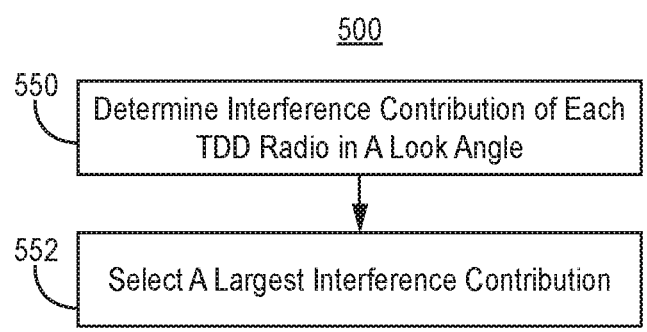
FIG. 5 illustrates another embodiment of a method of determining a largest interferer in a time division duplexing system.

FIG. 5 illustrates another embodiment of a method of determining a largest interferer in a time division duplexing system 500. FIG. 5 illustrates another embodiment of how to implement block 372. The method of FIG. 5 is performed for each TDD system having a radio in the neighborhood.

To the extent the method 500 shown in FIG. 5 is described herein as being implemented in the systems shown in FIG. 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 550, determine an interference contribution of each TDD radio (of a TDD system) in frequency spectrum and at a look angle of a point. When determining interference contribution, the antenna gain of the receiver that could be at the point is used to determine the interference level generated by each TDD radio (in the look angle) at the point.

In block 552, select a largest interferer from the two or more TDD radios in the look angle. The largest interferer has an interference contribution (e.g. power level) in the frequency spectrum at the point greater than the interference contribution of any other TDD radios (of the TDD system) in the look angle.

Exemplary Embodiments

Example 1 includes a method for determining a move list for a region of points, comprising: determining an initial sort list of an $M^{th}$ point of the region; if there is more than one time division duplexing (TDD) radio of a TDD system in the initial sort list, then generating a modified sort list for the $M^{th}$ point with respect to look angles about the $M^{th}$ point including at least two TDD radios within the neighborhood; generating at least one of: look angle removal lists for each look angle about the $M^{th}$ point based upon determining interference levels of radios in the modified sort list, or the initial sort list if there is no modified sort list, for the $M^{th}$ point; and a point move list for the $M^{th}$ point based upon a union of the look angle removal lists; and generating, from the look angle removal lists or the point move list, the move list identifying radios whose transmissions cease upon an incumbent receiver entering the region.

Example 2 includes the method of Example 1, wherein generating the modified sort list for the $M^{th}$ point with respect to look angles about the $M^{th}$ point including the at least two TDD radios within the neighborhood comprises: for each of the look angles about the $M^{th}$ point including at least two TDD radios within the neighborhood: determining a largest interferer in the look angle and in the region; and removing, from the initial sort list, other TDD radios in the look angle and in the region.

Example 3 includes the method of any of Examples 1-2, wherein generating the move list comprises generating a move list from the look angle removal lists or the point move list for each point in the region.

Example 4 includes the method of any of Examples 1-3, further comprising: determining if an incumbent receiver is in the region; and if an incumbent receiver is in the region, then causing transmissions of radios specified in the move list to cease transmission in spectrum shared by transmitters of the specified radios and the incumbent receiver.

Example 5 includes the method of any of Examples 1-4, further comprising: determining if at least one TDD radio of the TDD system is in any of the look angle removal lists; and if at least one TDD radio of the TDD system is in any of the look angle removal lists, then adding, to at least one of: (a) at least one corresponding look angle removal list and (b) a corresponding point move list, all other TDD radios which were in corresponding look angles and neighborhoods but were not originally in each corresponding initial look angle removal list, where the all other radios are of the TDD system.

Example 6 includes the method of any of Examples 1-5, further comprising receiving a request from at least one TDD radio of a TDD system to transmit in the frequency spectrum.

Example 7 includes a program product comprising a non-transitory processor-readable medium on which program instructions, configured to be executed by a programmable processor, are embodied, wherein the program instructions are operable to: determine an initial sort list of an $M^{th}$ point of a region; if there is more than one time division duplexing (TDD) radio of a TDD system in the initial sort list, then generate a modified sort list for the $M^{th}$ point with respect to look angles about the $M^{th}$ point including at least two TDD radios within the neighborhood; generate at least one of: look angle removal lists for each look angle about the $M^{th}$ point based upon determining interference levels of radios in the modified sort list, or the initial sort list if there is no modified sort list, for the $M^{th}$ point; and a point move list for the $M^{th}$ point based upon a union of the look angle removal lists; and generate, from the look angle removal lists or the point move list, a move list identifying radios whose transmissions cease upon an incumbent receiver entering the region.

Example 8 includes the program product of Example 7, wherein generate the modified sort list for the $M^{th}$ point with respect to look angles about the $M^{th}$ point including the at least two TDD radios within the neighborhood comprises: for each of the look angles about the $M^{th}$ point including at least two TDD radios within the neighborhood: determine a largest interferer in the look angle and in the region; and remove, from the initial sort list, other TDD radios in the look angle and in the region.

Example 9 includes the program product of any of Examples 7-8, wherein generating the move list comprises generating a move list from the look angle removal lists or the point move list for each point in the region.

Example 10 includes the program product of any of Examples 7-9, wherein the program instructions are further operable to: determine if an incumbent receiver is in the region; and if an incumbent receiver is in the region, then cause transmissions of radios specified in the move list to cease transmission in spectrum shared by transmitters of the specified radios and the incumbent receiver.

Example 11 includes the program product of any of Examples 7-10, wherein the program instructions are further operable to: determine if at least one TDD radio of the TDD system is in any of the look angle removal lists; and if at least one TDD radio of the TDD system is in any of the look angle removal lists, then add, to at least one of: (a) at least one corresponding look angle removal list and (b) a corresponding point move list, all other TDD radios which were in corresponding look angles and neighborhoods but were not originally in each corresponding initial look angle removal list, where the all other radios are of the TDD system.

Example 12 includes the program product of any of Examples 7-11, wherein the program instructions are further operable to receive a request from at least one TDD radio of a TDD system to transmit in the frequency spectrum.

Example 13 includes a system, comprising: shared access system (SAS) controller circuitry; wherein the SAS controller circuitry is configured to: determine an initial sort list of an $M^{th}$ point of a region; if there is more than one time division duplexing (TDD) radio of a TDD system in the initial sort list, then generate a modified sort list for the $M^{th}$ point with respect to look angles about the $M^{th}$ point including at least two TDD radios within the neighborhood; generate at least one of: look angle removal lists for each look angle about the $M^{th}$ point based upon determining interference levels of radios in the modified sort list, or the initial sort list if there is no modified sort list, for the $M^{th}$ point; and a point move list for the $M^{th}$ point based upon a union of the look angle removal lists; and generate, from the look angle removal lists or the point move list, a move list identifying radios whose transmissions cease upon an incumbent receiver entering the region.

Example 14 includes the system of Example 13, wherein generate the modified sort list for the $M^{th}$ point with respect to look angles about the $M^{th}$ point including the at least two TDD radios within the neighborhood comprises: for each of the look angles about the $M^{th}$ point including at least two TDD radios within the neighborhood: determine a largest interferer in the look angle and in the region; and remove, from the initial sort list, other TDD radios in the look angle and in the region.

Example 15 includes the system of any of Examples 13-14, wherein generating the move list comprises generating a move list from the look angle removal lists or the point move list for each point in the region.

Example 16 includes the system of any of Examples 13-15, wherein the SAS controller circuitry is further configured to: determine if an incumbent receiver is in the region; and if an incumbent receiver is in the region, then cause transmissions of radios specified in the move list to cease transmission in spectrum shared by transmitters of the specified radios and the incumbent receiver.

Example 17 includes the system of any of Examples 13-16, wherein the SAS controller circuitry is further configured to: determine if at least one TDD radio of the TDD system is in any of the look angle removal lists; and if at least one TDD radio of the TDD system is in any of the look angle removal lists, then add, to at least one of: (a) at least one corresponding look angle removal list and (b) a corresponding point move list, all other TDD radios which were in corresponding look angles and neighborhoods but were not originally in each corresponding initial look angle removal list, where the all other radios are of the TDD system.

Example 18 includes the system of any of Examples 13-17, wherein the SAS controller circuitry is further configured to receive a request from at least one TDD radio of a TDD system to transmit in the frequency spectrum.

Example 19 includes the system of any of Examples 13-18, wherein the SAS controller circuitry comprises processing circuitry coupled to communications circuitry.

Example 20 includes the system of any of Examples 13-19, wherein the SAS controller circuitry is coupled to at least one of: an environmental sensing capability system, at least one other SAS controller, the TDD system and other radios, and a central database.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

A processing system used in the present system and method can be implemented using software, firmware, hardware, or any appropriate combination thereof, as known to one of skill in the art. By way of example and not limitation, the processing circuitry 222A can include one or more of each of microprocessor circuitry, microcontroller circuitry, Digital Signal Processors (DSP) circuitry, Application Specific Integrated Circuits (ASICs), programmable logic device circuitry, and/or Field Programmable Gate Array (FPGA) circuitry. The processing system can also include functions with software programs, firmware, or other computer readable instructions for carrying out various process tasks, calculations, and control functions used in the present method and system.

The present method can be implemented by computer executable instructions, such as program modules or components, which are executed by at least one processor. Generally, program modules include routines, programs, objects, data components, data structures, algorithms, and the like, which perform particular tasks or implement particular data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures.

Suitable computer readable media may include storage or memory media such as the memory circuitry 222B illustrated herein. For example, the memory circuitry 222B may include magnetic media (such as conventional hard disks), optical media (such as CDs, DVDs, and Blu-ray discs, and semiconductor memory (such as Random Access Memory (RAM) (including, but not limited to, Dynamic Random Access Memory (DRAM), Synchronous Dynamic Random Access Memory (SDRAM), Double Data Rate (DDR) RAM, RAMBUS Dynamic RAM (RDRAM), and Static RANI (SRAM)), Read Only Memory (ROM), Electrically Erasable Programmable ROM (EEPROM), and Flash memory.

The invention claimed is:

1. A method for determining a move list for a region of points, comprising:
    determining an initial sort list of an $M^{th}$ point of the region;
    if there is more than one time division duplexing (TDD) radio of a TDD system in the initial sort list, then generating a modified sort list for the $M^{th}$ point with respect to look angles about the $M^{th}$ point including at least two TDD radios within the neighborhood;
    generating at least one of:
        look angle removal lists for each look angle about the $M^{th}$ point based upon determining interference levels of radios in the modified sort list, or the initial sort list if there is no modified sort list, for the $M^{th}$ point; and
        a point move list for the $M^{th}$ point based upon a union of the look angle removal lists; and
    generating, from the look angle removal lists or the point move list, the move list, the move list identifying radios whose transmissions cease upon an incumbent receiver entering the region.

2. The method of claim 1, wherein generating the modified sort list for the $M^{th}$ point with respect to look angles about the $M^{th}$ point including the at least two TDD radios within the neighborhood comprises:
    for each of the look angles about the $M^{th}$ point including at least two TDD radios within the neighborhood:
    determining a largest interferer in the look angle and in the region; and
    removing, from the initial sort list, other TDD radios in the look angle and in the region.

3. The method of claim 1, wherein generating the move list comprises generating a move list from the look angle removal lists or the point move list for each point in the region.

4. The method of claim 1, further comprising:
    determining if an incumbent receiver is in the region; and
    if an incumbent receiver is in the region, then causing transmissions of radios specified in the move list to cease transmission in spectrum shared by transmitters of the specified radios and the incumbent receiver.

5. The method of claim 1, further comprising:
determining if at least one TDD radio of the TDD system is in any of the look angle removal lists; and
if at least one TDD radio of the TDD system is in any of the look angle removal lists, then adding, to at least one of: (a) at least one corresponding look angle removal list and (b) a corresponding point move list, all other TDD radios which were in corresponding look angles and neighborhoods but were not originally in each corresponding initial look angle removal list, where the all other radios are of the TDD system.

6. The method of claim 1, further comprising receiving a request from at least one TDD radio of a TDD system to transmit in the frequency spectrum.

7. A program product comprising a non-transitory processor-readable medium on which program instructions, configured to be executed by a programmable processor, are embodied, wherein the program instructions are operable to:
determine an initial sort list of an $M^{th}$ point of a region;
if there is more than one time division duplexing (TDD) radio of a TDD system in the initial sort list, then generate a modified sort list for the $M^{th}$ point with respect to look angles about the $M^{th}$ point including at least two TDD radios within the neighborhood;
generate at least one of:
look angle removal lists for each look angle about the $M^{th}$ point based upon determining interference levels of radios in the modified sort list, or the initial sort list if there is no modified sort list, for the $M^{th}$ point; and
a point move list for the $M^{th}$ point based upon a union of the look angle removal lists; and
generate, from the look angle removal lists or the point move list, a move list identifying radios whose transmissions cease upon an incumbent receiver entering the region.

8. The program product of claim 7, wherein generate the modified sort list for the $M^{th}$ point with respect to look angles about the $M^{th}$ point including the at least two TDD radios within the neighborhood comprises:
for each of the look angles about the $M^{th}$ point including at least two TDD radios within the neighborhood:
determine a largest interferer in the look angle and in the region; and
remove, from the initial sort list, other TDD radios in the look angle and in the region.

9. The program product of claim 7, wherein generating the move list comprises generating a move list from the look angle removal lists or the point move list for each point in the region.

10. The program product of claim 7, wherein the program instructions are further operable to:
determine if an incumbent receiver is in the region; and
if an incumbent receiver is in the region, then cause transmissions of radios specified in the move list to cease transmission in spectrum shared by transmitters of the specified radios and the incumbent receiver.

11. The program product of claim 7, wherein the program instructions are further operable to:
determine if at least one TDD radio of the TDD system is in any of the look angle removal lists; and
if at least one TDD radio of the TDD system is in any of the look angle removal lists, then add, to at least one of: (a) at least one corresponding look angle removal list and (b) a corresponding point move list, all other TDD radios which were in corresponding look angles and neighborhoods but were not originally in each corresponding initial look angle removal list, where the all other radios are of the TDD system.

12. The program product of claim 7, wherein the program instructions are further operable to receive a request from at least one TDD radio of a TDD system to transmit in the frequency spectrum.

13. A system, comprising:
shared access system (SAS) controller circuitry;
wherein the SAS controller circuitry is configured to:
determine an initial sort list of an $M^{th}$ point of a region;
if there is more than one time division duplexing (TDD) radio of a TDD system in the initial sort list, then generate a modified sort list for the $M^{th}$ point with respect to look angles about the $M^{th}$ point including at least two TDD radios within the neighborhood;
generate at least one of:
look angle removal lists for each look angle about the $M^{th}$ point based upon determining interference levels of radios in the modified sort list, or the initial sort list if there is no modified sort list, for the $M^{th}$ point; and
a point move list for the $M^{th}$ point based upon a union of the look angle removal lists; and
generate, from the look angle removal lists or the point move list, a move list identifying radios whose transmissions cease upon an incumbent receiver entering the region.

14. The system of claim 13, wherein generate the modified sort list for the $M^{th}$ point with respect to look angles about the $M^{th}$ point including the at least two TDD radios within the neighborhood comprises:
for each of the look angles about the $M^{th}$ point including at least two TDD radios within the neighborhood:
determine a largest interferer in the look angle and in the region; and
remove, from the initial sort list, other TDD radios in the look angle and in the region.

15. The system of claim 13, wherein generating the move list comprises generating a move list from the look angle removal lists or the point move list for each point in the region.

16. The system of claim 13, wherein the SAS controller circuitry is further configured to:
determine if an incumbent receiver is in the region; and
if an incumbent receiver is in the region, then cause transmissions of radios specified in the move list to cease transmission in spectrum shared by transmitters of the specified radios and the incumbent receiver.

17. The system of claim 13, wherein the SAS controller circuitry is further configured to:
determine if at least one TDD radio of the TDD system is in any of the look angle removal lists; and
if at least one TDD radio of the TDD system is in any of the look angle removal lists, then add, to at least one of: (a) at least one corresponding look angle removal list and (b) a corresponding point move list, all other TDD radios which were in corresponding look angles and neighborhoods but were not originally in each corresponding initial look angle removal list, where the all other radios are of the TDD system.

18. The system of claim 13, wherein the SAS controller circuitry is further configured to receive a request from at least one TDD radio of a TDD system to transmit in the frequency spectrum.

19. The system of claim 13, wherein the SAS controller circuitry comprises processing circuitry coupled to communications circuitry.

20. The system of claim 13, wherein the SAS controller circuitry is coupled to at least one of: an environmental sensing capability system, at least one other SAS controller, the TDD system and other radios, and a central database.

\* \* \* \* \*